United States Patent
Pogosyan et al.

(10) Patent No.: US 10,185,504 B1
(45) Date of Patent: Jan. 22, 2019

(54) REDUCING DATA TRANSMITTED DURING BACKUP

(71) Applicant: Acronis International GmBh, Shaffhausen (CH)

(72) Inventors: Vitaliy Pogosyan, Moscow Region (RU); Ramil Yusupov, Magnitogorsk (RU); Anton Tsvetkov, Moscow (RU); Stanislav Protasov, Moscow (RU); Serguei M. Beloussov, Costa del Sol (SG)

(73) Assignee: ACRONIS INTERNATIONAL GMBH (CH)

( * ) Notice: Subject to any disclaimer, the term of this patent is extended or adjusted under 35 U.S.C. 154(b) by 0 days.

(21) Appl. No.: 14/952,232

(22) Filed: Nov. 25, 2015

Related U.S. Application Data

(60) Provisional application No. 62/084,882, filed on Nov. 26, 2014.

(51) Int. Cl.
   *G06F 3/06* (2006.01)
   *G06F 12/1018* (2016.01)

(52) U.S. Cl.
   CPC .......... *G06F 3/0619* (2013.01); *G06F 3/065* (2013.01); *G06F 3/067* (2013.01); *G06F 12/1018* (2013.01)

(58) Field of Classification Search
   USPC ...................................................... 711/162
   See application file for complete search history.

(56) References Cited

U.S. PATENT DOCUMENTS

| | | | |
|---|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |

(Continued)

*Primary Examiner* — Ryan Bertram
*Assistant Examiner* — Edmund H Kwong
(74) *Attorney, Agent, or Firm* — K&L Gates LLP

(57) ABSTRACT

A method for reducing an amount of data transmitted during a backup process is described. The method may include receiving input data to insert into a rating hash table during the backup process. The method may further include selecting, based on a hash function, a bucket of the rating hash table in which the input data will be inserted, the bucket including a plurality of blocks. The method may also include, in response to determining that the input data has already been inserted in one of the plurality of blocks, increasing a rating corresponding to the one of the plurality of blocks by a popularity rating increment. The method may additionally include, in response to determining that the input data has not already been inserted in one of the plurality of blocks, determining a first block with a smallest rating from the plurality of blocks.

18 Claims, 6 Drawing Sheets

| | Block #0 | | Block #1 | | Block #2 | | Block #3 | |
|---|---|---|---|---|---|---|---|---|
| | rating | hash | rating | hash | rating | hash | rating | hash |
| Bucket #0 | 155 | Hash1 | 0 | nodata | 0 | nodata | 0 | nodata |
| Bucket #1 | 56 | Hash2 | 34 | Hash3 | 266 | Hash4 | 0 | nodata |
| Bucket #2 | 34 | Hash5 | 54 | Hash6 | 0 | nodata | 0 | nodata |
| Bucket #3 | 356 | Hash7 | 166 | Hash8 | 56 | Hash9 | 0 | nodata |

(56) References Cited

U.S. PATENT DOCUMENTS

| | | |
|---|---|---|
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,751,763 B1 * | 6/2014 | Ramarao ........... G06F 17/30159 711/162 |
| 8,856,927 B1 | 10/2014 | Beloussov et al. |
| 8,930,306 B1 * | 1/2015 | Ngo ................... G06F 17/30194 707/610 |
| 8,996,830 B1 | 3/2015 | Lyadvinsky et al. |
| 2006/0225065 A1 | 10/2006 | Chandhok et al. |
| 2008/0010414 A1 * | 1/2008 | Kailas ................... G06F 12/126 711/133 |
| 2010/0011178 A1 | 1/2010 | Feathergill |
| 2012/0084518 A1 * | 4/2012 | Vijayan ............... G06F 11/1453 711/162 |
| 2013/0013865 A1 * | 1/2013 | Venkatesh ......... G06F 17/30132 711/133 |
| 2015/0286640 A1 * | 10/2015 | Horikawa ........... G06F 17/3033 707/747 |
| 2016/0350325 A1 * | 12/2016 | Wang ................... G06F 3/0608 |

* cited by examiner

REDUCING DATA TRANSMITTED DURING BACKUP

CROSS-REFERENCE TO RELATED APPLICATIONS

This application claims priority to and the benefit of U.S. provisional patent application No. 62/084,882, filed on Nov. 26, 2014, the disclosure of which is herein incorporated by reference in its entirety.

TECHNICAL FIELD

The technical field may generally relate to backup of physical or virtual machines and more particularly to reducing an amount of data transmitted during backup of physical or virtual machines.

BACKGROUND

Physical or virtual machines may run business critical or other applications. An entire physical or virtual machine or individual files or folders of the physical or virtual machine may require backup to ensure that the physical or virtual machine may be recovered in the event of a failure. Such backup of a physical or virtual machine may be difficult to create because backup processes may consume too many resources, causing low performance or high network load. For example, backup of large systems may consume too much memory, especially if caching processes are used.

BRIEF SUMMARY

In an embodiment, a method for reducing an amount of data transmitted during a backup process may include receiving input data to insert into a rating hash table during the backup process. The method may further include selecting, based on a hash function, a bucket of the rating hash table in which the input data will be inserted, the bucket including a plurality of blocks. The method may also include, in response to determining that, the input data has already been inserted in one of the plurality of blocks, increasing a rating corresponding to the one of the plurality of blocks by a popularity rating increment. The method may additionally include, in response to determining that the input data has not already been inserted in one of the plurality of blocks, determining a first block with a smallest rating from the plurality of blocks. Moreover the method may include inserting the input data in the first block.

One or more of the following features may be included. The method may further include setting a rating corresponding to the first block to an initial rating value. The method may also include, for each block of the plurality of blocks besides the first block, decreasing a corresponding rating by an aging rating increment. The method may additionally include, in response to determining that the input data has already been inserted in one of the plurality of blocks, decreasing a rating corresponding to the other blocks of the plurality of blocks by an aging rating increment. The input data may replace data already in the first block upon being inserted. The input data may have been sent or requested by a cloud computing client being backed up in a virtualization platform. The rating hash table may reside with the cloud computing client. A reduced amount of data may be transmitted during a compare operation of the backup process based on the rating hash table.

In an embodiment, a computer program product may reside on a computer readable storage medium and may have a plurality of instructions stored on it. When executed by a processor, the instructions may cause the processor to perform operations for reducing an amount of data transmitted during a backup process. The operations may include receiving input data to insert into a rating hash table during the backup process. The operations may further include selecting, based on a hash function, a bucket of the rating hash table in which the input data will be inserted, the bucket including a plurality of blocks. The operations may also include, in response to determining that, the input data has already been inserted in one of the plurality of blocks, increasing a rating corresponding to the one of the plurality of blocks by a popularity rating increment. The operations may additionally include, in response to determining that the input data has not already been inserted in one of the plurality of blocks, determining a first block with a smallest rating from the plurality of blocks. Moreover the operations may include inserting the input data in the first block.

One or more of the following features may be included. The operations may include setting a rating corresponding to the first block to an initial rating value. The operations may also include, for each block of the plurality of blocks besides the first block, decreasing a corresponding rating by an aging rating increment. The operations may additionally include, in response to determining that the input data has already been inserted in one of the plurality of blocks, decreasing a rating corresponding to the other blocks of the plurality of blocks by an aging rating increment. The input data may replace data already in the first block upon being inserted. The input data may have been sent or requested by a cloud computing client being backed up in a virtualization platform. The rating hash table may reside with the cloud computing client. A reduced amount of data may be transmitted during a compare operation of the backup process based on the rating hash table.

In an embodiment, a computing system for reducing an amount of data transmitted during a backup process may include one or more processors. The one or more processors may be configured to receive input data to insert into a rating hash table during the backup process. The one or more processors may be further configured to select, based on a hash function, a bucket of the rating hash table in which the input data will be inserted, the bucket including a plurality of blocks. The one or more processors may be also configured to, in response to determining that the input data has already been inserted in one of the plurality of blocks, increase a rating corresponding to the one of the plurality of blocks by a popularity rating increment. The one or more processors may be additionally configured to, in response to determining that the input data has not already been inserted in one of the plurality of blocks, determine a first block with a smallest rating from the plurality of blocks. Moreover, the one or more processors may be configured to insert the input data in the first block.

One or more of the following features may be included. The one or more processors may be configured to set a rating corresponding to the first block to an initial rating value. The one or more processors may also be configured to, for each block of the plurality of blocks besides the first block, decrease a corresponding rating by an aging rating increment. The one or more processors may additionally be configured to include, in response to determining that the input data has already been inserted in one of the plurality of blocks, decrease a rating corresponding to the other blocks of the plurality of blocks by an aging rating increment. The input data may replace data already in the first block upon being inserted. The input data may have been sent or requested by a cloud computing client being backed up in a virtualization platform. The rating hash table may reside with the cloud computing client. A reduced amount of data may be transmitted during a compare operation of the backup process based on the rating hash table.

In an embodiment, a system for reducing an amount of data transmitted during a backup process may include a rating hash table residing in a cloud computing client. The system may further include a plurality of buckets residing in the rating hash table, each bucket including a plurality of blocks, wherein each block includes data and a rating corresponding to the data. The system may also include a processor configured to run an insertion operation on the rating hash table. The data in each block may be rated based on how often the data is sent or requested. A reduced amount of data may be transmitted during a compare operation of the backup process based on the rating hash table.

In an embodiment, a method for reducing an amount of data transmitted during a compare operation of a backup process may include determining data to be transmitted between a cloud computing client and a server using the compare operation based on a rating hash table at a cloud computing client. The method may further include, in response to determining that a first portion of the data has a corresponding rating in the rating hash table that is less than a user defined rating threshold, transmitting the data between the cloud computing client and the server for the compare operation of the backup process. A second portion of the data may not be transmitted between the cloud computing client and the server for the compare operation of the backup process based on having a corresponding rating in the rating hash table that is not less than the user defined rating threshold. This may result in less data transmitted between the cloud computing client and the server for the compare operation of the backup process based on the rating hash table.

The details of one or more implementations are set forth in the accompanying drawings and the description below. Other features and advantages will become apparent from the description, the drawings, and the claims.

DETAILED DESCRIPTION

Overview

Figure 1:
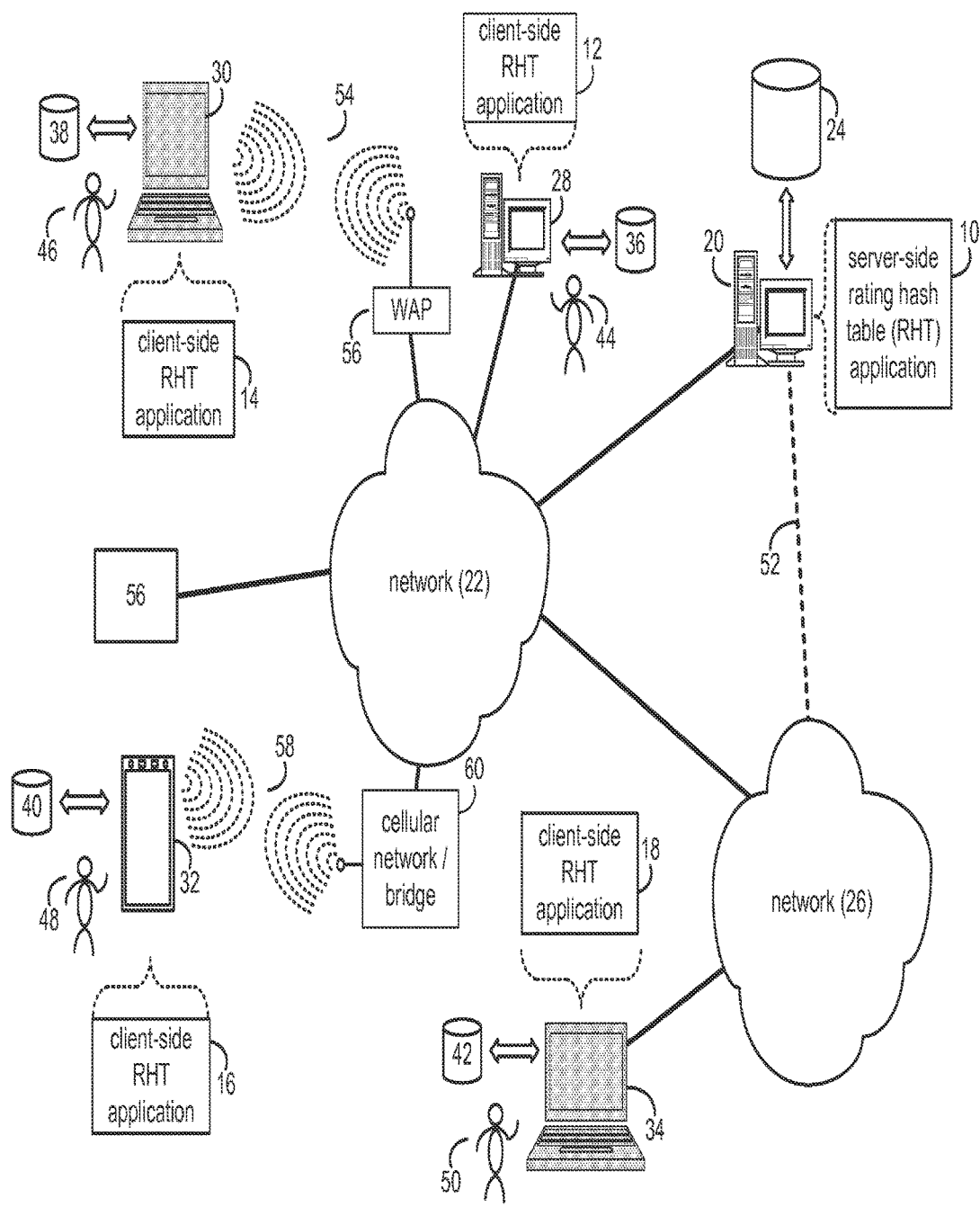
FIG. 1 depicts an example system that can execute implementations of the present disclosure.

A cloud provider or system administrator may institute backup and recovery procedures to ensure persistence of applications, data, or other resources accessed through one or more physical or virtual machines. For example, a backup archive of the physical or virtual machine may be created and stored onsite or offsite and may include the entire content of the physical or virtual machine before it failed. Efficient recovery of physical or virtual machines may be critical for proper business or other operations of an organization as application demands are likely to continue in the event of a physical or virtual machine failure.

Businesses and other organizations may have large amounts of data to backup and may make create backups often. Further, their data content may change quickly, which may require more backups to be created. Transmitting less data during a backup may free resources such as storage space, CPU time etc. During a backup, for each block of data, a hash may be calculated. Compare operations may be performed on a client side or a server side and may determine whether data requested by a server already exists there. A client may send a request to a server to compare new hashes with existing hashes, and depending on the results, may send the data to the serve (or storage device) for backup. For example, if the data does not exist on the server (or storage device) based on the compare operation, the client may send the data. If the data does exist on the server, the client may not send the data based on the compare operation.

During a backup, deduplication techniques may be used to reduce the amount of data transferred or transmitted. For example, a hash calculation of backed up data blocks on the client side may be performed and it may be verified that the server, which may include storage that keeps the backed up data, does not have the same data. Blocks may be backed up by first comparing a client-computed hash and a hash from the server. Hashes existing on the server may be checked against hashes of data for backup on a client. Hashes sent during backup may be added to a cache and the blocks need not be sent again in a later backup if they have already been added to the cache (i.e., the blocks have been saved already).

Keeping the most popular and frequently used hashes without using another piece of storage or external resources may not be possible because this may require further memory or storage capacity. Further memory fragmentation, which may result from the structure of data being backed up, may affect system stability or performance. High memory fragmentation may lead to errors during backup, and may also affect backup performance.

To increase stability, deduplication may not be used during backup, or hashes may not be cached on the client side during backup. However, both of these options may come at the expense of performance. Failure to use deduplication during backup may result in high network load because there may be more data or repeated data to transfer. Further, failure to cache hashes may result in low performance because there may be more data to transfer and efficiency of deduplication may decrease.

In view of the forgoing, there may be a need for a system that uses custom storage or nonstandard containers to facilitate backup. In some systems, the techniques and features described herein may allow for reducing an amount of data transmitted during a compare operation of a backup process, which may result in lower network load and/or higher performance during backup.

Increasing the efficiency of the compare operation (i.e., comparing data on the client and server may improve the backup process by reducing the amount of data transmitted during the backup process. As discussed in the present disclosure, an organized a hash table may be used to improve performance and transmit and compare less data during the backup process. This may reduce overload on the network during the compare operation of the backup process, which generally consumes a large amount of system resources.

Referring to FIG. 1, there is shown a server-side rating hash table (RHT) application 10 and client-side RHT applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as RHT process 10. Further, one or more of client applications 12, 14, 16, and 18 may be referred to as a process configured to carry out one or more of the features described herein, such as RHT processes 12, 14, 16, and/or 18.

As will be discussed below and referring now to FIG. 4, RHT process or application 10, 12, 14, 16, or 18 may receive 300 input data to insert into a rating hash table during the backup process. RHT process 10, 12, 14, 16, or 18 may also select 302, based on a hash function, a bucket of the rating hash table in which the input data will be inserted, the bucket including a plurality of blocks. RHT process 10, 12, 14, 16, or 18 may further, in response to determining 304 that the input data has already been inserted in one of the plurality of blocks, increase 306 a rating corresponding to the one of the plurality of blocks by a popularity rating increment. Additionally, RHT process 10, 12, 14, 16, or 18 may, in response to determining 308 that the input data has not already been inserted in one of the plurality of blocks, determine 310 a first block with a smallest rating from the plurality of blocks. Moreover, RHT process 10, 12, 14, 16, or 18 may insert 312 the input data in the first block.

The RHT process may be a server-side process (e.g., server-side RHT process 10), a client-side process (e.g., client-side RHT process 12, client-side RHT process 14, client-side RHT process 16, or client-side RHT process 18), or a hybrid server-side/client-side process (e.g., a combination of server-side RHT process 10 and one or more of client-side RHT processes 12, 14, 16, 18).

System Overview

Referring to FIG. 1, server-side RHT process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side RHT process 10, which may be stored on storage device 24 coupled to server computer 20, may be executed by one or snore processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side RHT processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side RHT processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side RHT processes 12, 14, 16, 18 and/or server-side RHT process 10 may be processes that run within (i.e., are part of) a cloud computing site, cloud computing application, cloud platform, or cloud environment. Alternatively, client-side RHT processes 12, 14, 16, 18 and/or server-side RHT process 10 may be stand-alone applications that work in conjunction with the cloud computing site, cloud computing application, cloud platform, or cloud environment. One or more of client-side RHT processes 12, 14, 16, 18 and server-side RHT process 10 may interface with each other (via network 22 and/or network 26).

Users 44, 46, 48, 50 may access server-side RHT process 10 directly through the device on which the client-side RHT process (e.g., client-side RHT processes 12, 14, 16, 18) is executed, namely client electronic devices 28, 30, 32, 34, for example. Users 44, 46, 48, 50 may access server-side RHT process 10 directly through network 22 and/or through secondary network 26. Further, server computer 20 (i.e., the computer that executes server-side RHT process 10) may be in communication with network. 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

RHT Process

For the following discussion, client-side RHT process 12 will be described for illustrative purposes and client computer 28 may run client-side RHT application 12 to carry out some or all of the techniques and features described here. It should be noted that client-side RHT process 12 may interact with server-side RHT process 10 and may be executed within one or more applications that allow for communication with server-side RHT process 10. However, this is not intended to be a limitation of this disclosure, as other configurations are possible (e.g., stand-alone, client-side RHT processes and/or stand-alone server-side RHT processes). For example, some implementations may include one or more of client-side RHT processes 14, 16, and 18 and server-side RHT process 10 in place of or in addition to client-side RHT process 12.

The systems and methods (e.g., RHT process 12) described herein relate to the backup of physical or virtual machines and/or physical or virtual machine disks, drives, files, and/or folders. In part, the systems and methods relate to reducing an amount of data transmitted during a compare operation of a backup process. The systems described herein may include one or more memory elements for backup of software, databases, and physical or virtual machines, and computer storage products including instructions to be executed by a processor to cause the processor to implement the methods described herein.

Referring now to FIG. 1, one or more of users 44, 46, 48, and 50 may be cloud administrators or system administrators or may be cloud or system end-users. Referring now also to FIG. 4, the cloud or system administrators may access and administer server computer 20 or client electronic devices 28, 30, 32, 34 (respectively). In an embodiment one or more of server computer 20 or client electronic devices 28, 30, 32, 34 may be a physical computer system, virtualization host device, or cloud computing client. The virtualization host device may include a virtual machine and may run a cloud or virtualization application such as VMWare™ or may include a bare-metal embedded hypervisor (e.g. VMware™ ESX™ and VMware™ ESXi™). Further, the virtualization host device may include a vCloud™ architecture that may enhance cooperation between hypervisors. RHT processes 10, 12, 14, 16, and/or 18 may include or may work in connection with an agent (e.g., a software module), which may include or may be configured to perform any number of the techniques or features described herein.

RHT processes 10, 12, 14, 16, and/or 18 may include a software component, executable code, function, subroutine, or other set of instructions designed to carry out one or more operations for rating hash tables and reducing an amount of data transmitted during a backup process. For example, RHT process 12 may coordinate a backup and/or restore process.

A physical or virtual machine may run, for example, business critical applications for which physical or virtual machine files may need to be backed up, recovered and/or restored upon a failure. The physical or virtual machine files may be backed up before a system failure. A backup operation or process may be initiated by a user. The user may select an entire disk or drive to be backed up, or may select a portion of the disk or drive to be backed up. In an implementation, the user may select one or more files or folders for backup. In response to receiving instructions for backup, a physical or virtual machine may begin a backup process.

A cache may be created on a client computer or cloud computing client that needs to be backed up. A rating hash table as discussed here may be an implementation of such a cache.

Figure 2:
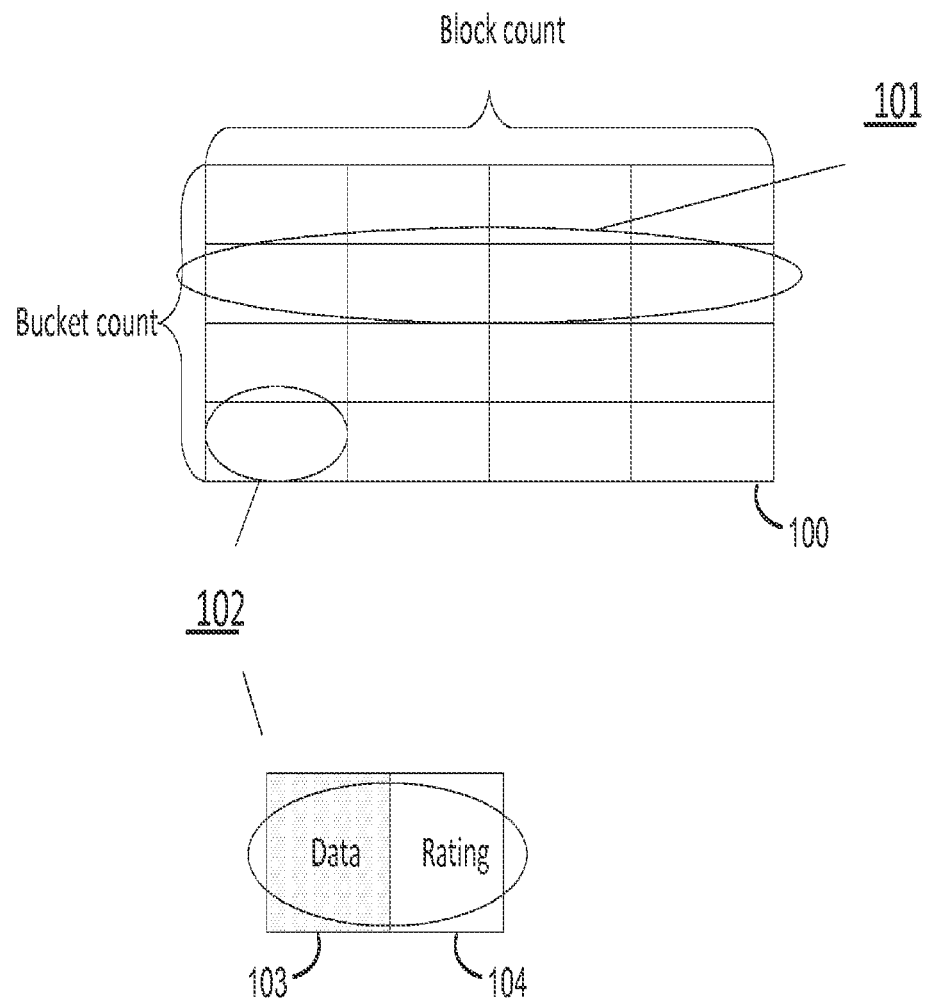
FIG. 2 depicts an example rating hash table in accordance with the present disclosure.

Referring now to FIG. 2, an example rating hash table is shown. Rating hash table 100 may be a pre-allocated hash table. Rating hash table 100 may include one or more, buckets (e.g., bucket 101). Each bucket may be an array of blocks and may include a plurality of blocks (e.g., block 102). Each block may include content or data (e.g., data 103) and a corresponding rating (e.g., rating 104). As such, the content of rating hash table 100 may include an associated popularity level (i.e., rating). When input data is sent to be entered in the rating hash table, calculations using the content ratings may be performed and the results of the calculations may be used to determine which content (i.e., data) will be replaced with the input data. For example, the content/data with the smallest rating may be replaced by the input data.

Hashes of blocks which are sent or requested (e.g., on the client side) may be cached. An entire hash may be cached on the client side. A rating hash table may be a way of organizing and implementing a cache process. If a data block was sent or requested by a client at least once, it may never be sent or requested again because it was cached. However, backup archives may be very large (up to 2 TB or more). It may consume too many resources to keep the hashes of all the blocks sent in a cache. For example, if a hash is 32 bytes, and the size of each block is 4 KB, about 16 GB may be needed to cash 2 TB of data. This may be too much for a client machine.

For this reason, to reduce memory consumption, a cache which keeps information about the latest hashes or most often requested hashes (or e.g., least recently used (LRU) or least frequently used (LFU)) may be used. For example, a structure described herein, which may be referred to as a rating hash table, may be used.

RHT process 12 as described herein may be a pre-deduplication process that may help to reduce the amount of data transmitted during a compare operation of a backup process. For example, a client computer or cloud computing client may have a portion of software that prepares data tier backup, and RHT process 12 may be a portion of that software.

For example, if data on the client side is frequently used or requested, then it may not be necessary to compare this data with data on the server because it is likely that this data is already stored at the server. Thus, some data can be eliminated from the set of data transmitted for the compare operation of the backup process. Using a rating process to assign higher ratings for the more frequently used or requested data may help determine which data does not needed to be transmitted between the client and the server for the compare operation of the backup process.

Hashes with higher ratings have likely already been sent to the server, and the server will have already cached those hashes. The hashes with the higher ratings may correspond to data that is likely already in the server because several clients (e.g., cloud computing clients) may have the same or similar data or run similar applications. These clients may have already been backed up to the server during a previous backup of an incremental backup process, and thus most of the data may already be at the server. Because the backup may be incremental, most of the data besides data that changed may already be at the server.

Thus, if a hash has a higher rating, it need not be sent to the server again. The higher the rating a hash has in the RHT, the higher probability that the hash was already cached or backed up. As such, implementing an RHT may reduce the amount of data sent to a server for the compare operation of the backup process based on ratings of hashes. The rating level for which the corresponding data need not be transmitted for the compare operation may be a user defined or administrator defined rating level based on specific data characteristics or types. While the RHT process and related techniques and features may be described herein as being implemented on a client side, a server side implementation may also be used and is within the scope of the present disclosure.

Figure 3:
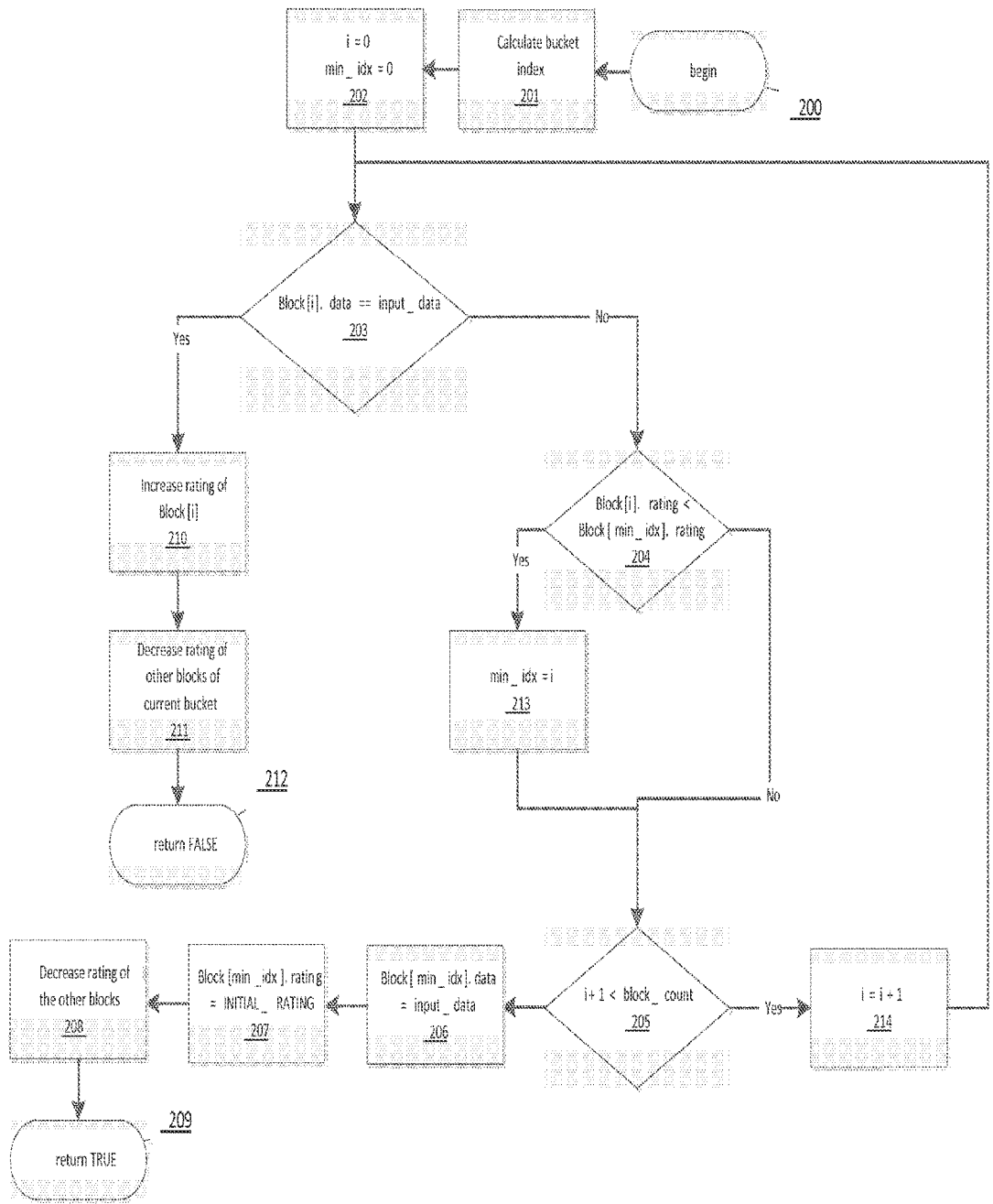
FIG. 3 is a diagrammatic flow-hart illustrating the incremental nature of implementations of the present disclosure.
Figure 5:
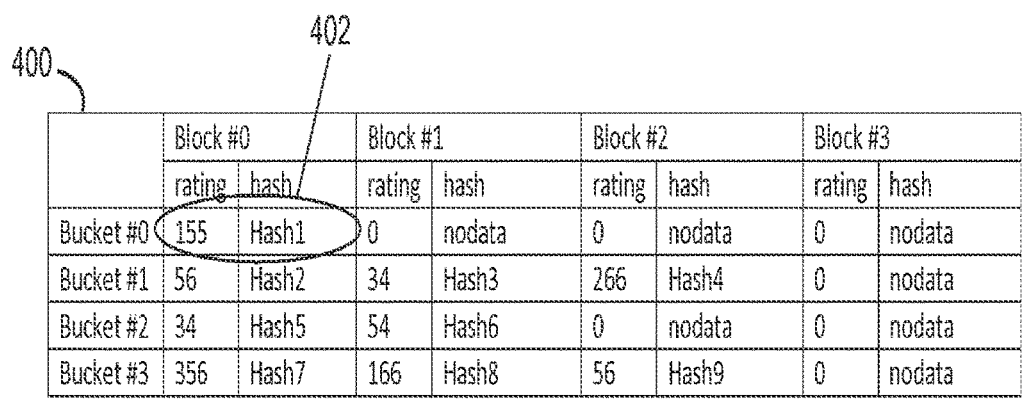
FIG. 5 also depicts an example rating hash table in accordance with the present disclosure.

Referring now to FIG. 3, RHT process 12 may begin 200 an insertion operation. RHT process 12 may calculate 201 a bucket index for the rating hash table (e.g., rating hash table 400 as shown in FIG. 5). The bucket index may be based on a hash (fingerprint) of the block. For example, it could be the first 8 bytes of the hash or a hash function which may achieve uniformly distributed data (e.g., MD5 or message-digest algorithm 5 may be such a hash function). Considering this, raw bits of a hash may be used.

Further, RHT process 12 may initialize 202 system variables. For example, "min_idx" may be the index of the block within a bucket that has the smallest rating. "Block[min_idx]" may be the block with the minimum rating within the bucket. The block itself may be the hash plus its rating. The record, which may include the data cached by hash and the corresponding rating, may be used here. "Block_count" may be the number of elements that can be placed in a bucket as the bucket may gave a fixed size. "INITIAL_RATING" may be the rating of a newly added element (i.e., input data). "i" may be the index of the record that is being processed. Upon initialization, a cycle counter may be set to the index of the first block (e.g., block 402 as shown in FIG. 5). Further, the index of the block with the smallest rating may be set to the index of the first block (e.g., min_idx=0).

Figure 6:
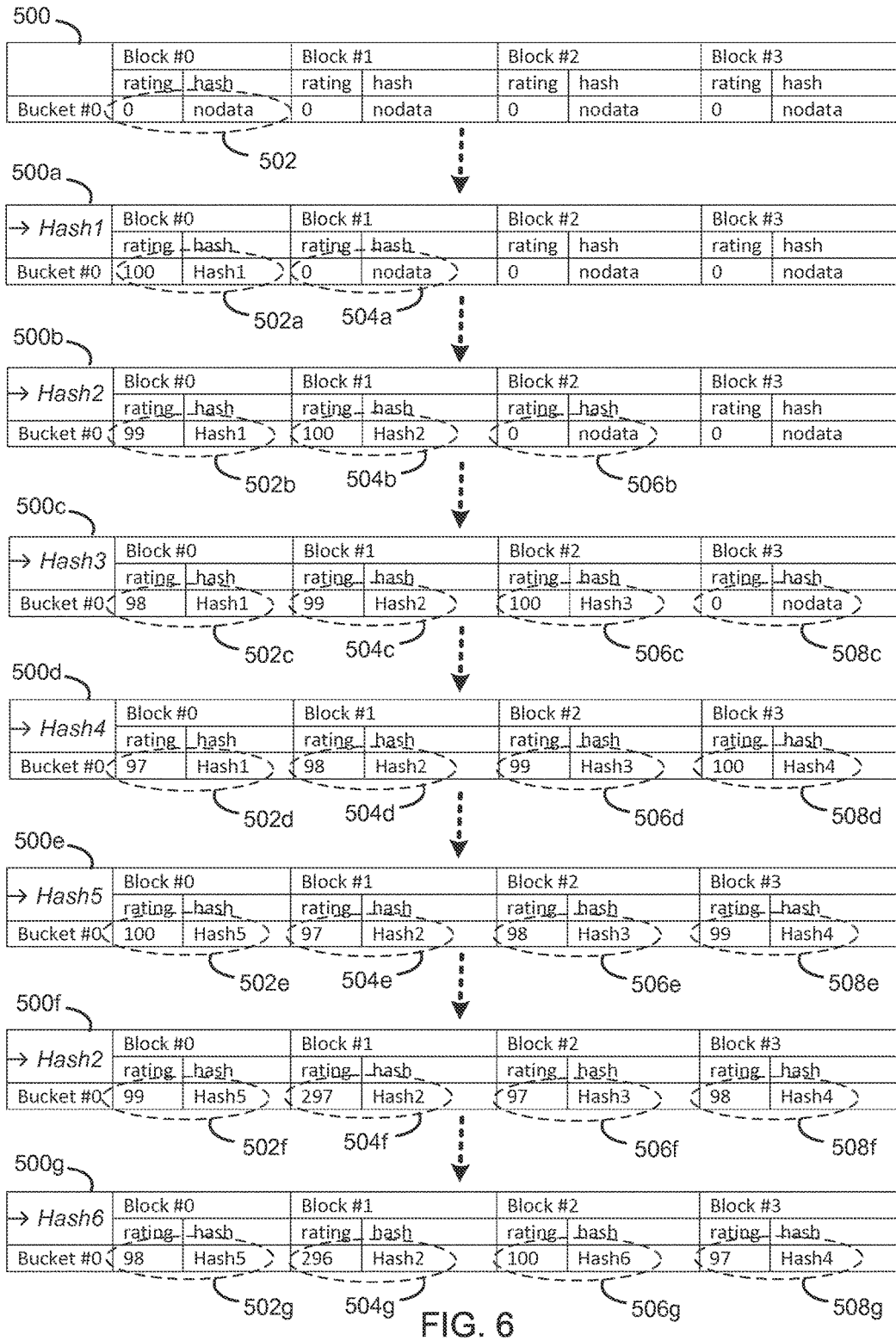
FIG. 6 depicts example rating hash tables illustrating the incremental nature of implementations of the present disclosure.

FIG. 5 shows an example rating hash table (e.g., rating hash table 400) in accordance with the present disclosure. Rating hash table 400 may have a bucket count of 4 and a block count of 4. Referring now also to FIG. 6, rating hash table 500 may have no data or ratings and may have just been initialized. Referring now also to FIG. 4, RHT process 12 may receive 300 input data (e.g., "Hash1." as shown in FIG. 6) to insert into a rating hash table (e.g., rating hash table 500) during a backup process. For example, "Hash1" may be received for input in a backup process as data being prepared for backup.

Further, RHT process 12 may select 302, based on a hash function, a bucket (e.g., Bucket #0 as shown in FIG. 6) of the rating hash table (e.g., rating hash table 500) in which the input data will be inserted. For example, the bucket may be selected based on the result of the expression "HashFunction (inserting Hash) % bucket_count" (or similar, where "inserting Hash" may be a basic operation for hash tables). I.e., BucketIndex=HashFunction(inserting_Hash) % bucket_count. The bucket may include a plurality of blocks (e.g., Block #0, Block #1, Block #2, Block #3 as shown in FIG. 6). Once the bucket is selected, an insertion operation may be performed. The other, non-selected buckets may not matter for a particular insertion because LRU and LFU replacement logic may be in the selected bucket. The rating hash table may be implemented as a raw archive and buckets may follow one after the other, because data may be uniformly distributed in a hash by a hash function. Thus, further operations on the hash may not be necessary.

RHT process 12 may determine whether the input data, such as "Hash1" as shown with an arrow in rating hash table 500a, has already been inserted in one of the plurality of blocks (e.g., Block #0, Block #1, Block #2, Block #3) of, e.g., Bucket #0 of rating hash table 500a. For example, with reference to FIGS. 3 and 6, RHT process 12 may apply and use the result of the expression "Block[i]data.==input_data" (or similar) to determine 203 whether the input data (i.e., "input_data") has already been inserted into one of the plurality of blocks. With reference to FIG. 4, in response to determining 308 that the input data (e.g., "Hash1") has not already been inserted in one of the plurality of blocks (e.g., Block #0, Block #1, Block #2, Block #3 of rating hash table 500a), RHT process 12 may determine 310 a first block (e.g., "Block #0") with a smallest rating from the plurality of blocks. With reference to FIG. 3, RHT process 12 may apply and use the result of the expression "Block[i].rating<Block[min_idx].rating" (or similar) to determine 204 the first block (e.g., "Block. #0") with a smallest rating from the plurality of blocks.

RHT process 12 may apply and use the expression "i+1<block_count" to determine 205 if the index of the next block "i+1" is less than the "block_count". If so, cycle counter "i" may be increased by "1" and operation 203 (i.e., apply expression "Block[i]data.==input_data") may be performed again. If not RHT process 12 may proceed to operation 206, as described below. Further, RHT process 12 may set 213 "i" as the index of minimal value and go back to operation 205. Also, RHT process 12 may increase 214 cycle counter "i" by one and go back to operation 203.

Once RHT process 12 finds the first block (e.g., "Block #0" where "min_idx"=0) with a smallest rating (e.g., "0" as shown in block 502) from the plurality of blocks, RHT process 12 may insert 312 the input data (e.g., "Hash1") in the first block, as shown in block 502a of FIG. 6. For example, RHT process 12 may apply the expression "Block[min_idx].data input_data" (or similar) to fill 206 the block with the smallest rating value (i.e., "Block[min_idx]") with the input data (e.g., "Hash1").

RHT process 12 may also set 314 a rating corresponding to the first block (with the smallest rating, such as block 502a) to an initial rating value. The initial rating value may be a rating for newly added data. Various tuning and parameters may be used by users or a system administrator to provide desired results for various backup types and sources. For example, the initial rating may be set at "100". RHT process 12 may apply the expression "Block[min_idx].rating=INITIAL_RATING" (or similar) to set 207 the rating of the first block with the initial rating of "100", as shown in block 502a.

Additionally, for each block of the plurality of blocks besides the first block (with the smallest rating), Block #1, Block #2, Block #3 as shown in rating hash table 500e), RHT process 12 may decrease 316 a corresponding rating by an aging rating increment. The aging rating increment may be set by users or a system administrator to provide desired results for various backup types and sources. Decreasing 208 the rating of other blocks (i.e., besides the first block) may facilitate the backup process by incorporating an aging process, which may allow RHT process 12 determine the LRU/LFU hashes, RHT process 12 may return 209 TRUE to indicate that the input data (e.g., "Hash1") was not found in the rating hash table (e.g., rating hash table 500) and has been inserted (e.g., in block 502a).

The aging rating increment may be set to "1". For example, the ratings of "Hash2", "Hash3", and "Hash4" in Block #1, Block #2, and Block #3, respectively, of rating hash table 500e may be reduced by "1" to "97", "98", and "99", respectively. A user or system administrator may set one or more preferences defining a minimum rating, which may be "0" as shown in rating has table 500a. As such, Block #1, Block #2, and Block #3 of rating hash table 500a may not have corresponding ratings decreased.

Continuing with the above example, consider for illustrative purposes rating hash table 500b of FIG. 6, with RHT process 12 receiving input data "Hash2". As shown in rating hash table 500a, the first block with the smallest rating from the plurality of blocks is Block #1, shown as block 504a. In other words, because Block #0 has a hash rating of "100", Block #1 has a hash rating of "0", Block #2 has a hash rating of "0", and Block #3 has a hash rating of "0", min_idx=1 and Block #1 is selected as the first block with smallest rating (i.e., "0").

Thus, RHT process 12 may insert "Hash2" into Block #1 of rating hash table 500b, marked as block 504b. Further, RHT process 12 may set the rating of block 504b as the initial rating, which may be "100" as shown in block 504b. After insertion, all other block ratings in the bucket (i.e., Bucket #0) may be decreased and the rating of Block #0, shown as block 502b, may become "99". The ratings of Block #2 and Block #3 in rating hash table 500b may not be decreased due to, for example, a user or system administrator having set one or more preferences defining a minimum rating, which may be "0".

Similarly, consider for illustrative purposes rating hash table 500c of FIG. 6, with RHT process 12 receiving input data "Hash3". As shown in rating hash table 500b, the first block with the smallest rating from the plurality of blocks is Block #2, shown as block 506b. In other words, because Block #0 has a hash rating of "99", Block #1 has a hash rating of "100", Block #2 has a hash rating of "0", and Block #3 has a hash rating of "0", min_idx=2 and Block #2 is selected as the first block with smallest rating (i.e., "0"). Thus, RHT process 12 may insert "Hash3" into Block #2 of rating hash table 500c, marked as block 506c. Further, RHT process 12 may set the rating of block 506c as the initial rating, which may be "100" as shown in block 506c. After insertion, all other block ratings in the bucket (i.e., Bucket #0 of rating hash table 500c) may be decreased and the ratings of Block #0 and Block #1, shown as blocks 502c and 504c, may become "98" and "99" respectively. The rating of Block #3 in rating hash table 500c may not be decreased due to, for example, a user or system administrator having set one or more preferences defining a minimum rating, which may be "0".

Further, regarding rating hash table 500d of FIG. 6, RHT process 12 may receive input data "Hash4". As shown in rating hash table 500c, the first block with the smallest rating from the plurality of blocks is Block #3, shown as block 508c. In other words, because Block #0 has a hash rating of "98", Block #1 has a hash rating of "99", Block #2 has a hash rating of "100", and Block #3 has a hash rating of "0", min_idx=3 and Block #3 is selected as the first block with smallest rating (i.e., "0"). Thus, RHT process 12 may insert "Hash4" into Block #3 of rating hash table 500d, marked as block 508d. Further, RHT process 12 may set the rating of block 508d as the initial rating, which may be "100" as shown in block 508d. After insertion, all other block ratings in the bucket (i.e., Bucket #0 of rating hash table 500d) may be decreased and the ratings of Block #0, Block #1, and Block #2 shown as blocks 502d, 504d, and block 506d may become "97", "98", and "99" respectively.

Regarding rating hash table 500e of FIG. 6, RHT process 12 may receive input data "Hash5". As shown in rating hash table 500d, the first block with the smallest rating from the plurality of blocks is Block #0, shown as block 502e. In other words, because Block #0 has a hash rating of "97", Block #1 has a hash rating of "98", Block #2 has a hash rating of "99", and Block #3 has a hash rating of "100", min_idx=0 and Block #0 is selected as the first block with smallest rating (i.e., "97"). Thus, RHT process 12 may insert "Hash5" into Block #0 of rating hash table 500e, marked as block 502e. In this way, referring also to FIG. 4, the input data (e.g., "Hash5") may replace 320 data already in the first block (e.g., "Hash1" as shown in block 502d of rating hash table 500d) upon being inserted. Further, RHT process 12 may set the rating of block 502e as the initial rating, which may be "100" as shown in block 502e. After insertion, all other block ratings in the bucket (i.e., Bucket #0 of rating hash table 500e) may be decreased and the ratings of Block #1, Block #2, and Block #3 shown as block 504e, block 506e, and block 508e may become "97", "98", and "99", respectively.

RHT process 12 may also, in response to determining 304 that the input data (e.g., "Hash2" as shown in rating hash table 500f) has already been inserted in one of the plurality of blocks (e.g., block 504f as shown in rating hash table 500f), increase 306 a rating corresponding to the one of the plurality of blocks (e.g., block 504f) by a popularity rating increment. For example, RHT process 12 may receive input data "Hash2".

Referring also to FIG. 3, RHT process 12 may apply the expression "Block[i].data==input_data" to determine 203 if "Block[i]" (e.g., Block #0, Block #1, Block #2, Block #3 of rating hash table 500f) has the same data (e.g., "Hash2" of block 504f) as the input data (e.g., "Hash2"). If so, RHT process 12 may increase 210 the rating of Block[i] as this data has already been inserted. If not, RHT process 12 may continue and check (204) for which block in the bucket has the smallest rating, as described above.

The popularity rating increment may be set by users or a system administrator to provide desired results for various backup types and sources. For example, the popularity rating increment may be set to "200". As such, RHT process 12 may increase the rating of block 504f by "200" to "297" as shown in FIG. 6. Further, RHT process 12 may decrease 318 the rating corresponding to the other blocks of the plurality of blocks (e.g., Block #0, Block #2, and Block #3 of rating hash table 500f) by the aging rating increment. For example, RHT process 12 may decrease 211 the rating of blocks 502f, 506f, and 508f by "1" to "99", "97", "and 98", respectively. MT process 12 may return 212 FALSE to indicate that the input data (e.g., "Hash2") was found in the rating hash table (e.g., rating hash table 500f) and was not inserted.

Considering rating hash table 500g of FIG. 6, RHT process 12 may receive input data "Hash6". As shown in rating hash table 500f, the first block with the smallest rating from the plurality of blocks is Block #2, shown as block 506f. In other words, because Block #2 has a hash rating of "97", Block #0 has a hash rating of "99", Block #1 has a hash rating of "297", and Block #3 has a hash rating of "100", min_idx=2 and Block #2 is selected as the first block with smallest rating (i.e., "97"). Thus, RHT process 12 may insert "Hash6" into Block #2 of rating hash table 500g, marked as block 506g.

Figure 4:
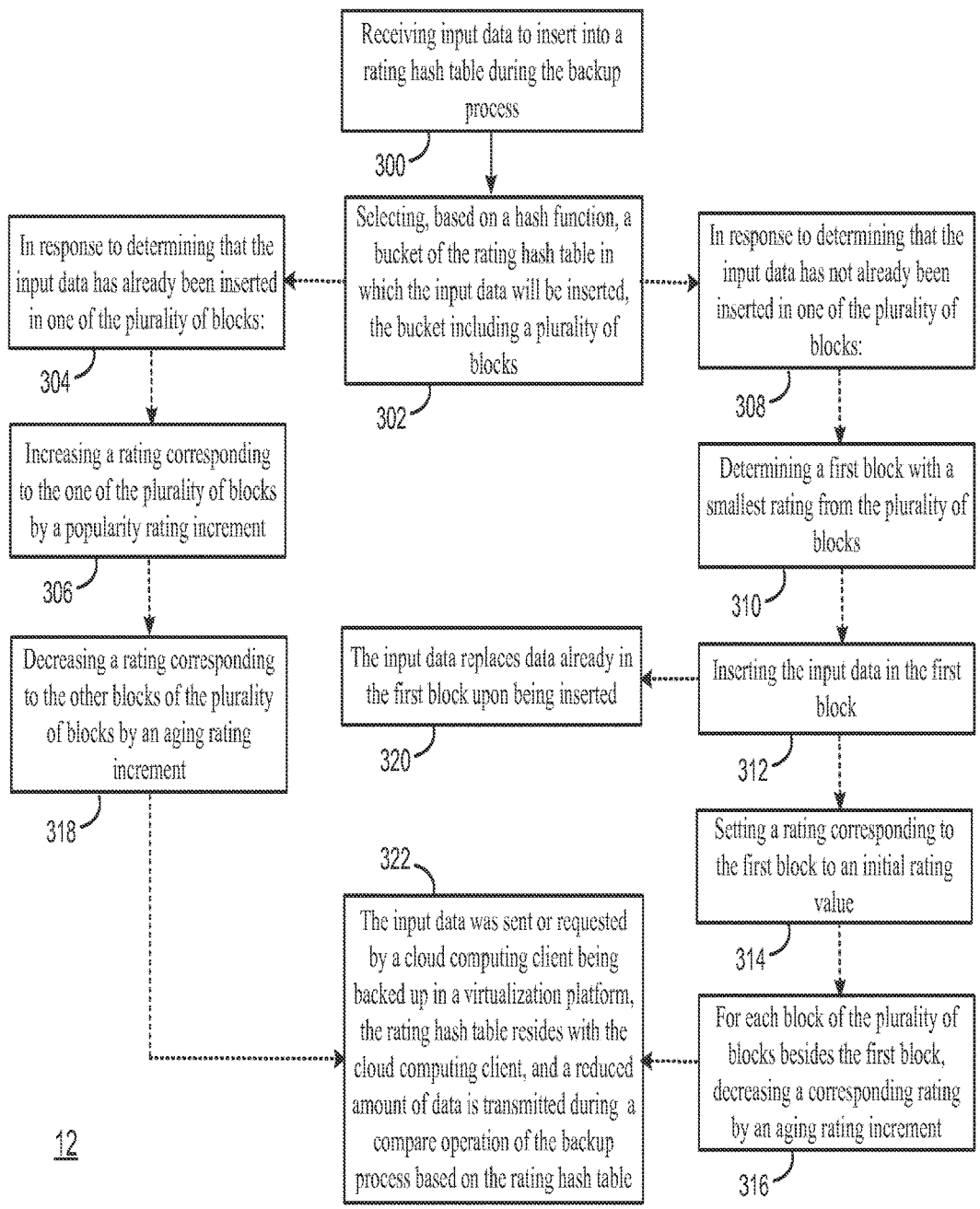
FIG. 4 is a flowchart illustrating an example process for reducing an amount of data transmitted during a backup process in accordance with the present disclosure.

In this way, referring also to FIG. 4, the input data (e.g., "Hash6") may replace 320 data already in the first block (e.g., "Hash3" as shown in block 506f of rating hash table 500f) upon being inserted. Further, RHT process 12 may set the rating of block 506g as the initial rating, which may be "100" as shown in block 506g. After insertion, all other block ratings in the bucket (i.e., Bucket #0 of rating hash table 500g) may be decreased and the ratings of Block #0, Block #1, and Block #3 shown as block 502g, block 504g, and block 508g may become "98", "296", and "97", respectively.

The input data (e.g., "Hash6" as shown in rating hash table 500g) may have been sent or requested (322) by a cloud computing client being backed up in a virtualization platform. The rating hash table may reside with the cloud computing client. A reduced amount of data may be transmitted during a compare operation of the backup process based on the rating hash table. For example, less data may be sent to backup by optimizing deduplication and not sending the repeated hashes to the server during an operation to compare data in the client and the server, which may determine which data needs to be backed up from the client because that data is not already stored on the server.

Further, the techniques and features described herein may be applied to local and network attached storage, which may require an intensive deduplication of data stored thereon. The result may be higher backup speed and less storage space consumed.

Additionally, the techniques and features described herein may be applied to cloud storage, which may include a huge volume of data. Cloud storage may generally be relatively slower than local and network attached storage. Thus, decreasing the amount of data sent may result in more efficient and faster data archiving.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand; and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, SQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for reducing an amount of data transmitted during a backup process, the method comprising:
   receiving input data to insert into a rating hash table during the backup process;
   selecting, based on a hash function, a bucket of the rating hash table in which the input data will be inserted, the bucket including a plurality of blocks;
   in response to determining that the input data has already been inserted in one of the plurality of blocks:
      increasing a rating corresponding to the one of the plurality of blocks by a popularity rating increment;
   in response to determining that the input data has not already been inserted in one of the plurality of blocks:
      determining a first block with a smallest rating from the plurality of blocks;
      inserting the input data in the first block with the smallest rating;
   in response to determining that the input data has already been inserted in one of the plurality of blocks:
      decreasing a rating corresponding to the other blocks of the plurality of blocks by an aging rating increment; and
      determining data that does not need to be transmitted from a client to a server using the backup process based on hash values having higher assigned ratings from popularity increment increases, wherein hash values from the client are rated and data associated with such hash values is selectively backed up to the server.

2. The method of claim 1, further comprising:
   setting a rating corresponding to the first block to an initial rating value.

3. The method of claim 1, further comprising:
   for each block of the plurality of blocks besides the first block, decreasing a corresponding rating by an aging rating increment.

4. The method of claim 1, wherein the input data was sent or requested by a cloud computing client being backed up in a virtualization platform.

5. The method of claim 1, wherein the input data was sent or requested by a cloud computing client being backed up in a virtualization platform, the rating hash table resides with the cloud computing client, and a reduced amount of data is transmitted during a compare operation of the backup process based on the rating hash table.

6. A computer program product residing on a computer readable storage medium having a plurality of instructions stored thereon, which, when executed by a processor, causes the processor to perform operations for reducing an amount of data transmitted during a backup process, the operations comprising:
   receiving input data to insert into a rating hash table during the backup process;
   selecting, based on a hash function, a bucket of the rating hash table in which the input data will be inserted, the bucket including a plurality of blocks;
   in response to determining that the input data has already been inserted in one of the plurality of blocks:
      increasing a rating corresponding to the one of the plurality of blocks by a popularity rating increment;
   in response to determining that the input data has not already been inserted in one of the plurality of blocks:
      determining a first block with a smallest rating from the plurality of blocks;
      inserting the input data in the first block;
   in response to determining that the input data has already been inserted in one of the plurality of blocks:
      decreasing a rating corresponding to the other blocks of the plurality of blocks by an aging rating increment; and
      determining data that does not need to be transmitted from a client to a server using the backup process based on hash values having higher assigned ratings from popularity increment increases, wherein hash values from the client are rated and data associated with such hash values is selectively backed up to the server.

7. The computer program product of claim 6, wherein the operations further comprise:
   setting a rating corresponding to the first block to an initial rating value.

8. The computer program product of claim 6, wherein the operations further comprise:
   for each block of the plurality of blocks besides the first block, decreasing a corresponding rating by an aging rating increment.

9. The computer program product of claim 6, wherein the operations further comprise:
   in response to determining that the input data has already been inserted in one of the plurality of blocks:
      decreasing a rating corresponding to the other blocks of the plurality of blocks by an aging rating increment.

10. The computer program product of claim 6, wherein the input data replaces data already in the first block upon being inserted.

11. The computer program product of claim 6, wherein the input data was sent or requested by a cloud computing client being backed up in a virtualization platform, the rating hash table resides with the cloud computing client, and a reduced amount of data is transmitted during a compare operation of the backup process based on the rating hash table.

12. A computing system for reducing an amount of data transmitted during a backup process, the computing system comprising one or more processors, wherein the one or more processors are configured to:
   receive input data to insert into a rating hash table during the backup process;
   select, based on a hash function, a bucket of the rating hash table in which the input data will be inserted, the bucket including a plurality of blocks;
   in response to determining that the input data has already been inserted in one of the plurality of blocks:
      increase a rating corresponding to the one of the plurality of blocks by a popularity rating increment;
   in response to determining that the input data has not already been inserted in one of the plurality of blocks:
      determine a first block with a smallest rating from the plurality of blocks;
      insert the input data in the first block;
   in response to determining that the input data has already been inserted in one of the plurality of blocks:
      decrease a rating corresponding to the other blocks of the plurality of blocks by an aging rating increment; and
      determine data that does not need to be transmitted from a client to a server using the backup process based on hash values having higher assigned ratings from popularity increment increases, wherein hash values from the client are rated and data associated with such hash values is selectively backed up to the server.

13. The computing system of claim 12, wherein the one or more processors are further configured to:
   set a rating corresponding to the first block to an initial rating value.

14. The computing system of claim 12, wherein the one or more processors are further configured to:
   for each block of the plurality of blocks besides the first block, decrease a corresponding rating by an aging rating increment.

15. The computing system of claim 12, wherein the one or more processors are further configured to:
   in response to determining that the input data has already been inserted in one of the plurality of blocks:
      decrease a rating corresponding to the other blocks of the plurality of blocks by an aging rating increment.

16. The computing system of claim 12, wherein the input data replaces data already in the first block upon being inserted.

17. The computing system of claim 12, wherein the input data was sent or requested by a cloud computing client being backed up in a virtualization platform, the rating hash table resides with the cloud computing client, and a reduced amount of data is transmitted during a compare operation of the backup process based on the rating hash table.

18. A system for reducing an amount of data transmitted during a backup process, the system comprising:
   a rating hash table residing in a cloud computing client;
   a plurality of buckets residing in the rating hash table, each bucket including a plurality of blocks, wherein each block includes data and a rating corresponding to the data; and
   a processor configured to run an insertion operation on the rating hash table,
   the processor configured to increase rating of a first set of hash values of data at a client based on popularity rating of such first set of hash values, and
   the processor configured to decrease rating of a second set of hash values of data at the client based on aging rating of such second set of hash values,
   wherein the data in each block is rated based on how often the data is sent or requested at the client and a reduced amount of data is transmitted to a backup server during a compare operation of the backup process based on the rating hash table, wherein the processor is further configured to determine a first block with a smallest rating from the plurality of blocks of a bucket; and insert the input data in a first block with the smallest rating, wherein hash values from the client are rated to generate first and second hash values, wherein the data associated with such first set of hash values is selectively backed up to the backup server.

\* \* \* \* \*